United States Patent [19]

Kent

[11] 4,178,198
[45] Dec. 11, 1979

[54] METHOD AND APPARATUS FOR TREADING TIRES

[75] Inventor: Jan H. F. Kent, St. Martin, Channel Islands

[73] Assignee: Kentredder Limited, St. Saviour, Channel Islands

[21] Appl. No.: 873,864

[22] Filed: Jan. 31, 1978

[30] Foreign Application Priority Data

Feb. 7, 1977 [GB] United Kingdom ............... 4891/77
Sep. 13, 1977 [GB] United Kingdom ............. 38121/77

[51] Int. Cl.² .......................... B29H 5/02; B29H 5/30
[52] U.S. Cl. ...................................... 156/96; 156/127; 156/129; 156/394 FM; 264/326; 425/389; 425/DIG. 44
[58] Field of Search ................. 156/96, 123, 126–129, 156/394; 264/36, 314, 315, 326; 425/14, 15, 17, 20, 389, DIG. 44, 112; 248/354 L

[56] References Cited

U.S. PATENT DOCUMENTS

| 3,151,013 | 9/1964 | Nebout | 156/126 |
| 3,713,929 | 1/1973 | Bohasso et al. | 156/127 |
| 3,790,425 | 2/1974 | Leblond | 156/127 |
| 3,883,382 | 5/1975 | Pelletier | 156/96 |
| 3,964,949 | 6/1976 | Kent et al. | 156/96 |
| 4,011,125 | 3/1977 | Pelletier | 156/96 |

FOREIGN PATENT DOCUMENTS 963953 7/1964 United Kingdom.
1460297 12/1976 United Kingdom.

*Primary Examiner*—John E. Kittle
*Attorney, Agent, or Firm*—Diller, Ramik & Wight

[57] ABSTRACT

A method of applying a tread band to a tire carcass includes the steps of placing a pre-vulcanized tread band on the inner surface of a resiliently flexible tread band holder and deforming the band holder inwardly to contact the tread band with a tire carcass. The deformation is carried out using inflatable air bags on the outer surface of the tread band holder. The deformation shortens the periphery of the tread band and produces a compressive stress in the band, which is retained in the band after bonding to the tire carcass.

20 Claims, 8 Drawing Figures

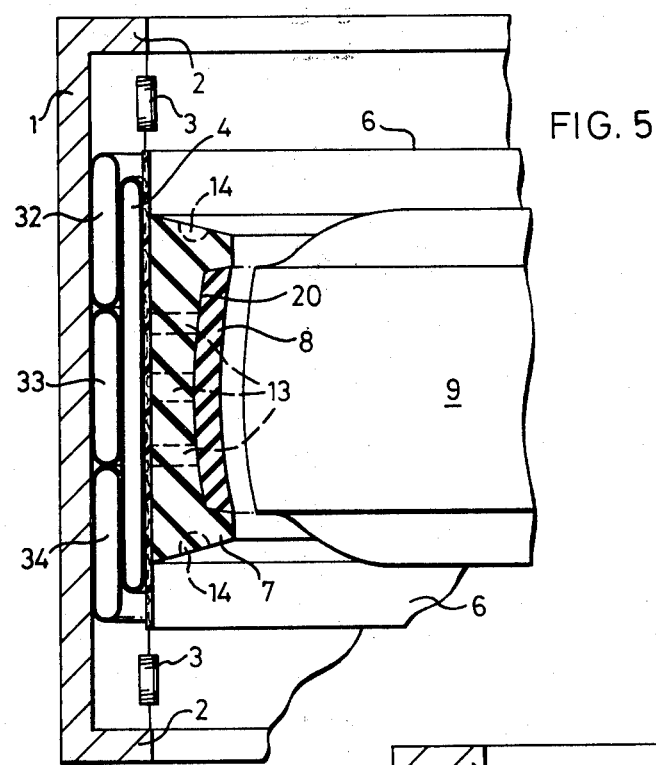
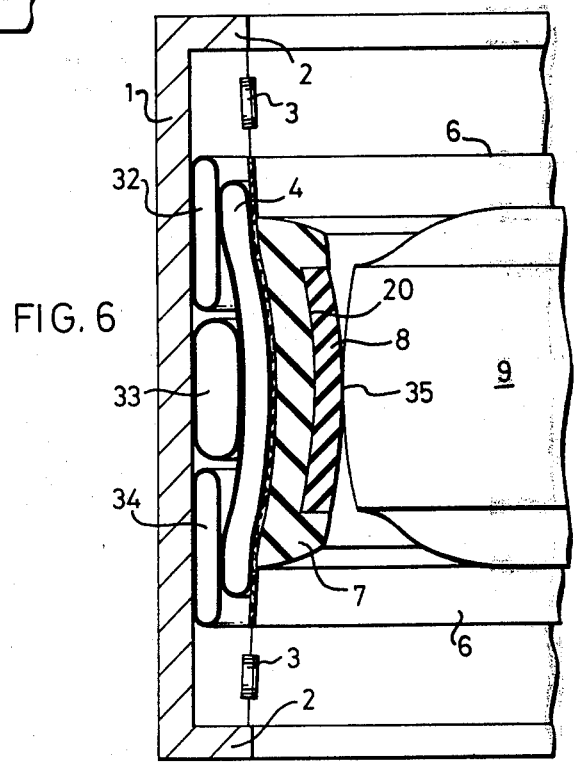

METHOD AND APPARATUS FOR TREADING TIRES

This invention relates to applying a tread band to a tyre carcass, for example a pneumatic tyre carcass, either for retreading used tyres or for applying the treads of new tyres.

The treading of a tyre with a tread band which has been pre-vulcanised is well known. It has also been found that if a pre-vulcanised tread band is bonded to a tyre in such a way that a compressive stress is induced into the tread band and is present both before and during bonding, the compressive stress will remain in the tread band after bonding and throughout the life of the tread band. This compressive stress helps to increase the resistance of the tread band to abrasion and also results in increased mileage from the finished tyre.

British patent specification No. 1,460,297 describes a method for bonding a pre-vulcanised tread band to a tyre carcass so that a compressive stress remains in the tread band after bonding, and this method is particularly effective in treading a radial ply tyre. However, the dimensions of the tyres made by different manufacturers of radial ply tyres tend to differ, and this difference complicates matters for the tyre treader who uses the method of British patent specification No. 1,460,297 since he must possess a large number of different size moulds for carrying out the method disclosed therein.

By means of the present invention it is possible to bond a pre-vulcanised tread band onto a tyre carcass quickly and easily without having to use a variety of moulds of different diameters, so that a compressive stress is induced into the tread band and is retained in the tread band after bonding.

According to the present invention there is provided a method of applying a tread band to a tyre carcass comprising the steps of locating a pre-vulcanised annular tread band, whose inner periphery is greater than the outer periphery of the tyre carcass to be treaded, on the inner surface of tread band holder having an adjustable diameter, placing the tyre carcass adjacent the tread band so that their mid-circumferential planes coincide, and urging the tread band into contact with the tyre carcass by reducing the diameter of the tread band holder, thereby shortening the outer periphery of the tread band and causing a compressive stress to be set up in the tread band, the compressive stress being maintained while the band is bonded to the carcass so that, in the final assembly of tyre carcass and tread band, the outer periphery of the tread band is under compressive stress.

Preferably, the tread band holder is an annular, resiliently flexible holder, the diameter of which is reduced by deforming the band holder inwardly.

In order to reduce the possibility of trapping air between the tread band and tyre carcass, the tread band may be urged into contact with the tyre carcass so that the mid-circumferential lines of the peripheries of the tread band and tyre carcass first make contact, with subsequent lateral outspreading contact between said peripheries.

According to a further aspect of the invention there is provided a tyre treading apparatus for applying a pre-vulcanised, annular tread band to a tyre carcass, the carcass to be treaded having an outer periphery smaller than the inner periphery of the tread band, comprising an annular, resiliently flexible tread band holder for accommodating the tread band on the inner periphery of the holder and means for deforming the tread band holder inwardly so as to urge a tread band located on the holder against the tyre carcass.

The pre-vulcanised annular tread band may, if desired, consist of a plurality of abutting tread segments which may be bonded together at their joints before or after compression. The use of tread segments may also permit the wearing properties of different rubber compounds to be tested under similar degrees of compression, thus enabling the most appropriate rubber compound to be chosen for a particular degree of compression.

Preferably, the tread band holder is resiliently attached to a rigid, coaxial annular support which is of greater diameter than the tread band holder. The attachment of the tread band holder to the annular support may advantageously be achieved by means of a series of springs attached to side flanges on the annular support, the springs being circumferentially spaced around the flanges.

The tread band holder is preferably deformed inwardly by means of a first inflatable bag sandwiched between the inner wall of the annular support and the outer periphery of the tread band holder, gas pressure being supplied to the bag in order to inflate it and thereby force it against the tread band holder.

The tread band holder may have a longitudinal channel formed in the central portion thereof to accommodate the tread band. The side portions of the holder are preferably thicker than the central portion, which ensures that the central portion flexes inwardly before the side portions. The tread band holder is suitably made of rubber or similar resilient material.

An advantage of the method and apparatus of the present invention is that they enable a compressive stress to be equally distributed over the whole circumference of the tread band, since the tread band holder undergoes identical inward deformation at each point around its circumference. This means that there is little likelihood of one part of the tread band wearing out before another part when the finished tyre is in use on the road.

The equal distribution of a compressive stress is facilitated by positioning the inflatable bag referred to above so that, as gas pressure builds up in the bag, first the central region of the tread band and then the outer region thereof move into contact with the tyre carcass. A further advantage of this arrangement is that any air in the gap between the tread band and the tyre carcass is gradually squeezed out, thereby reducing the possibility of air being trapped between the tread band and the tyre carcass in the finished tyre assembly.

Even better contact between the tread band and tyre carcass can be obtained by using a second inflatable bag of larger transverse cross-section than the first bag, and sandwiched between the first bag and the tread band holder. When the second bag is inflated, it assists in urging the marginal regions of the tread band into contact with the tyre inducing thereby reducing a similar amount of compressive stress in the marginal regions as in the central regions of the tread band. This additional pressure on the marginal regions of the tread band also helps to create a strong bond between the tyre carcass and the marginal regions.

In a preferred embodiment of the invention, two further air bags, one on each side of the first air bag, are sandwiched between the annular support and the marginal regions of the second air bag. The first air bag is inflated to move the central region of the tread band towards the tyre carcass, and the second and two further air bags are then inflated to move the marginal regions of the tread band towards the carcass. This ensures that the tread band and tyre carcass first contact each other along the mid-circumferential lines of their peripheries, with subsequent lateral outspreading contact between said peripheries.

In order to bond the tread band to the tyre carcass, suitable bonding material must first be applied to the bonding surface of the tread band and/or tyre carcass. The bonding material is preferably a layer of unvulcanised rubber, which is vulcanised after the tread band and tyre carcass have been urged into contact so as to produce a permanent bond therebetween. It is also possible to use bonding material which undergoes rapid vulcanisation in the apparatus of the invention, thereby rendering it unnecessary to remove the tread band/tyre carcass assembly from the apparatus for vulcanisation. A rapid vulcanising accelerator such as "Ancazate XX" may be used, or two-part solutions which vulcanise very quickly may also be used. Examples of the latter are "Botrix" or "Pangit". The vulcanisation process can also be speeded up by pre-warming the tread band and tyre carcass or both, or by using heating means inside the tread band holder.

By means of the method and apparatus of the present invention it is possible to shorten the outer periphery of the tread band by at least 0.5%, and preferably by 1% to 10%, more preferably by 1% to 6%.

The invention is now described by way of example with reference to the accompanying drawings, wherein:

FIG. 5 is a transverse sectional view through part of the apparatus of FIG. 4, showing the construction of the tread band holder, with a tyre carcass in position ready for bonding to the tread band.

FIG. 6 is a view similar to FIG. 5, showing the initial contact between tread band and tyre carcass.

Figure 1:
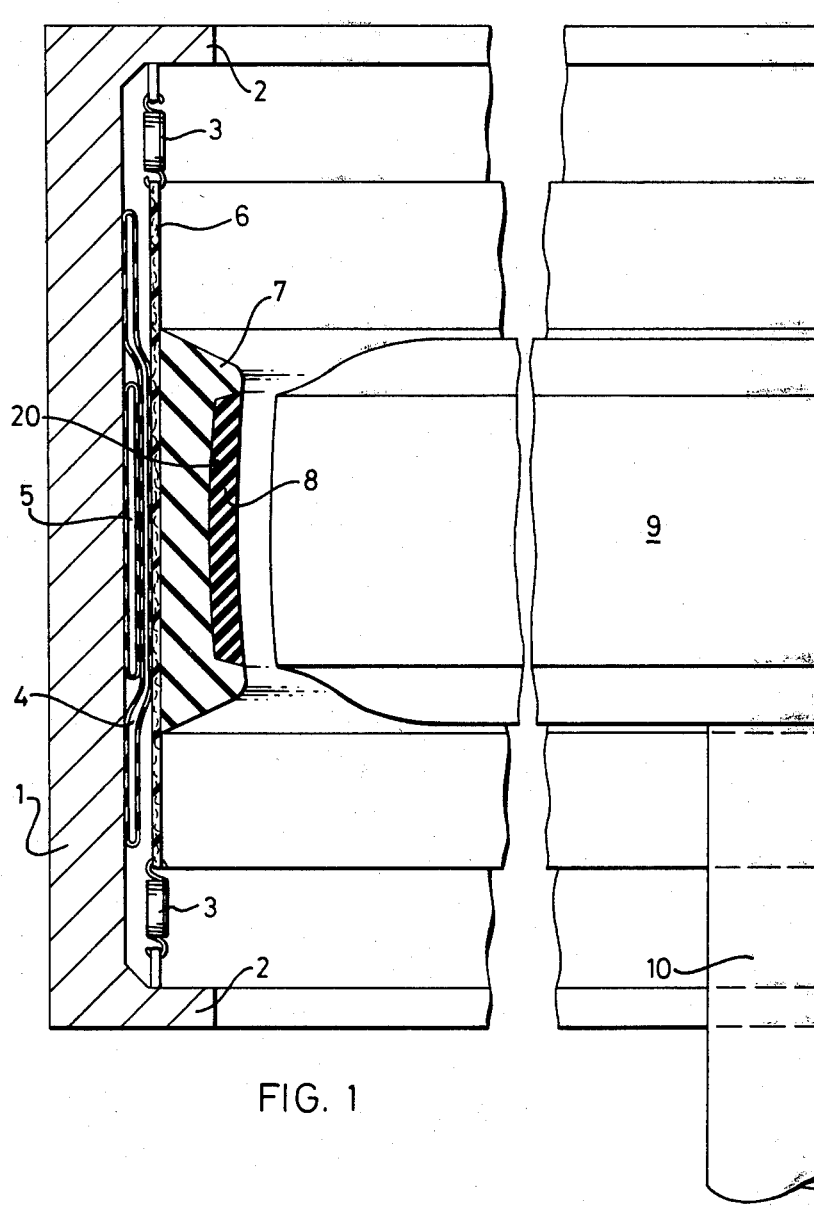
FIG. 1 is a transverse sectional view through part of the tyre treading apparatus, showing the tread band and tyre carcass in position before bonding them together.

Referring to FIG. 1 of the drawings, a tyre treading apparatus comprises a rigid annular support 1 having inward peripheral flanges 2. The annular support 1 is conveniently made of a relatively light, strong material such as fibre glass.

The inner surface of each flange 2 carries a series of circumferentially spaced springs 3, an end of each spring 3 being attached to a flexible cylindrical ring 6 of material which is able to expand and contract evenly when subjected to a load. A suitable material for this purpose is tyre cord, calandered to be embedded in a flexible rubber such as is used in normal tyre construction. Several plies of the tyre cord may be employed with the cords in each ply biassed alternately at a suitable angle, preferably 45°, to each other.

Mounted centrally on the inner side of ring 6 is an annular tread band holder 7 preferably made of resilient material such as rubber and having a longitudinal channel 20 moulded on its inner face, the channel 20 being dimensioned to receive and firmly hold a pre-vulcanised tread band 8 under zero compressive stress. It can be seen that the side portions of the holder 7 are thicker than the central portion thereof, which ensures that the central portion flexes inwardly before the side portions when pressure is applied to the holder 7 to deform it inwardly.

Located in the space formed between the flexible ring 6 and the inner surface of the support 1 are two inextensible air bags, 4 and 5, of the type described in British patent specification No. 963953, the air bag 5 which is adjacent the support 1 having a substantially smaller transverse cross-section than the air bag 4 which is adjacent the flexible ring 6.

Inwardly of the tread band 8, and spaced slightly therefrom, is located a buffed tyre carcass 9 carried in an inflated condition on a supporting rim, such as a road rim (not shown) the tyre carcass 9 being movable at right angles to the mid-circumferential plane of the tread band 8 by means of, for example, hydraulic pressure acting on a ram 10 which supports the rim.

In order to bond the tread band 8 to the tyre carcass 9, suitable bonding material is first applied to the bonding surface of the tread band 8 and/or the tyre carcass 9. The bonding material may be any suitable bonding material commonly used in tyre building processes, and preferably comprises a layer of vulcanised rubber. The tread band 8 is then located in the channel 20 and the ram 10 is actuated so as to bring the carcass 9 within the tread band 8 so that the mid-circumferential planes of the band 8 and the carcass 9 are coincident.

Figure 2:
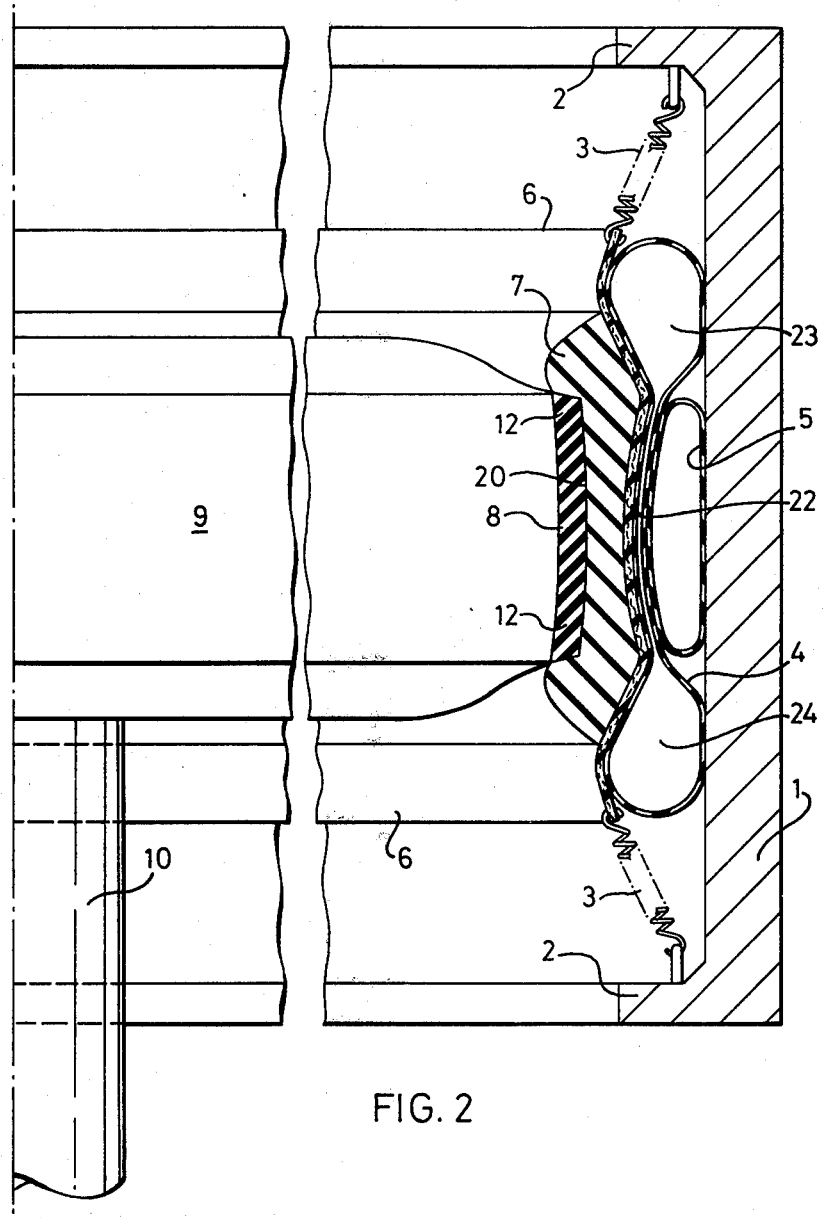
FIG. 2 is a similar view to FIG. 1, showing the tread band being bonded to the tyre carcass.

Referring now to FIG. 2 of the drawings, the air bag 5 is inflated by supplying air under pressure to it and this forces the central region of the flexible ring 6, including the tread band holder 7, towards the tyre carcass 9. Consequently, the tread band 8 is urged towards the carcass 9, the central area of the tread band 8 being the first to contact the bonding surface of the carcass 9. Movement of the tread band 8 towards the tyre carcass 9 causes a shortening in the circumference of the tread band 8 which in turn causes a compressive stress to be set up in the tread band 8. As inflation of the air bag 5 proceeds, the whole width of the tread band 8 is progressively brought into contact with the tyre carcass 9, thereby forcing any air out of the gap between the carcass 9 and the band 8 and reducing the possibility of any air being trapped between the carcass 9 and the band 8 in the finished tyre assembly. When air bag 5 is fully inflated, or even just before it is fully inflated, air bag 4 is inflated so as to build up pressure on the outer areas of the bonding surface between the tread band 8 and the carcass 9. As can be seen in FIG. 2, air which is supplied to air bag 4 cannot occupy the region 22 sandwiched between air bag 5 and ring 6 because of the pressure exerted on the region 22 by air bag 5. Therefore air pressure in air bag 4 tends to build up in the marginal portions 23 and 24 of air bag 4, which causes pressure to be exerted on the outer areas of the bonding surface between the tread band 8 and the tyre carcass 9.

Thus, the use of air bag 4 enables pressure to be exerted on the marginal areas 12 of the tread band 8 which helps to ensure a strong, even bond between tread band 8 and tyre carcass 9.

At this stage in the tyre treading process, vulcanisation at the bonding surface in situ can be carried out or, alternatively, if the bonding material is sufficiently strong to hold the tread band 8 temporarily in place on the carcass 9, the assembly of tread band 8 and carcass 9 may be removed from the apparatus after deflation of the air bags 4 and 5 and vulcanisation can be carried out in another part of the plant, thereby leaving the apparatus of the invention available for treading a further tyre. This can clearly speed up the tyre treading operation, since the time consuming step of vulcanisation need not be done in the same apparatus in which the tyre is treaded.

Figure 3:
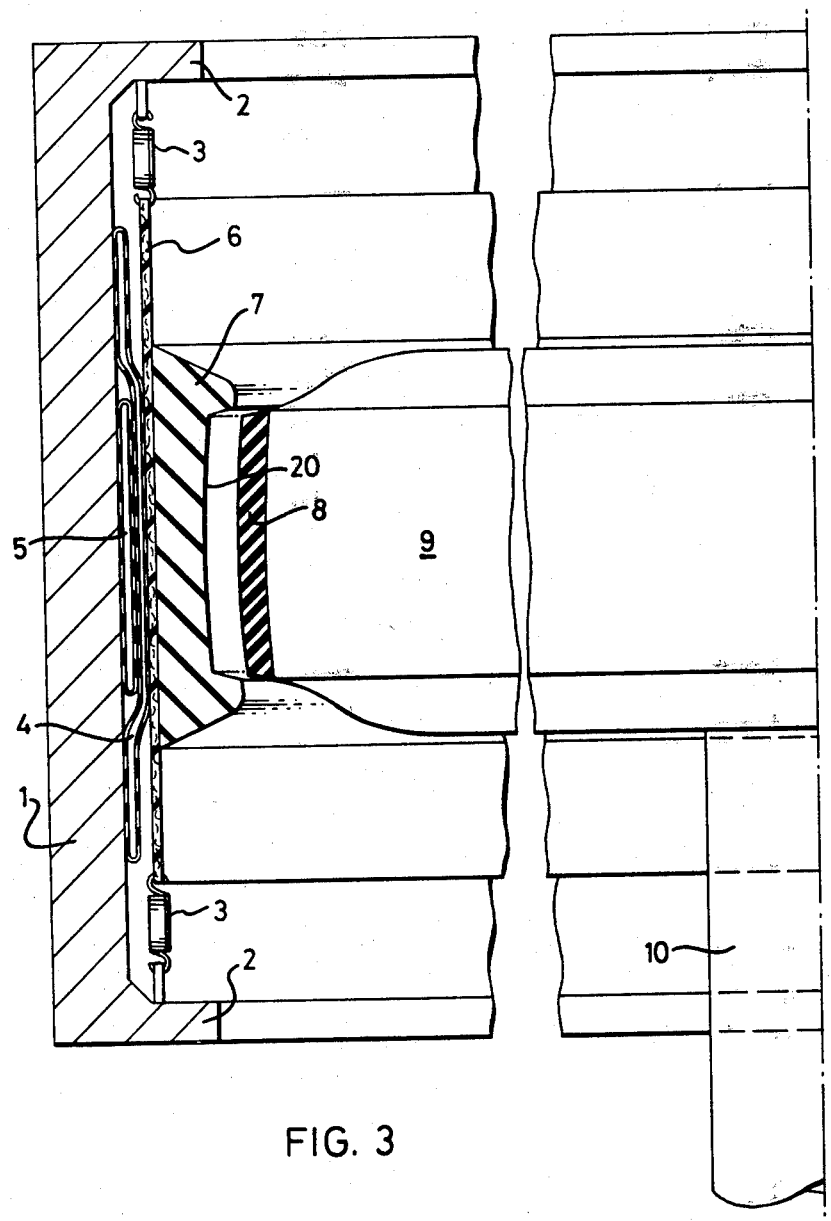
FIG. 3 is a similar view to FIG. 1, showing the tread band after bonding it to the tyre carcass.
Figure 4:
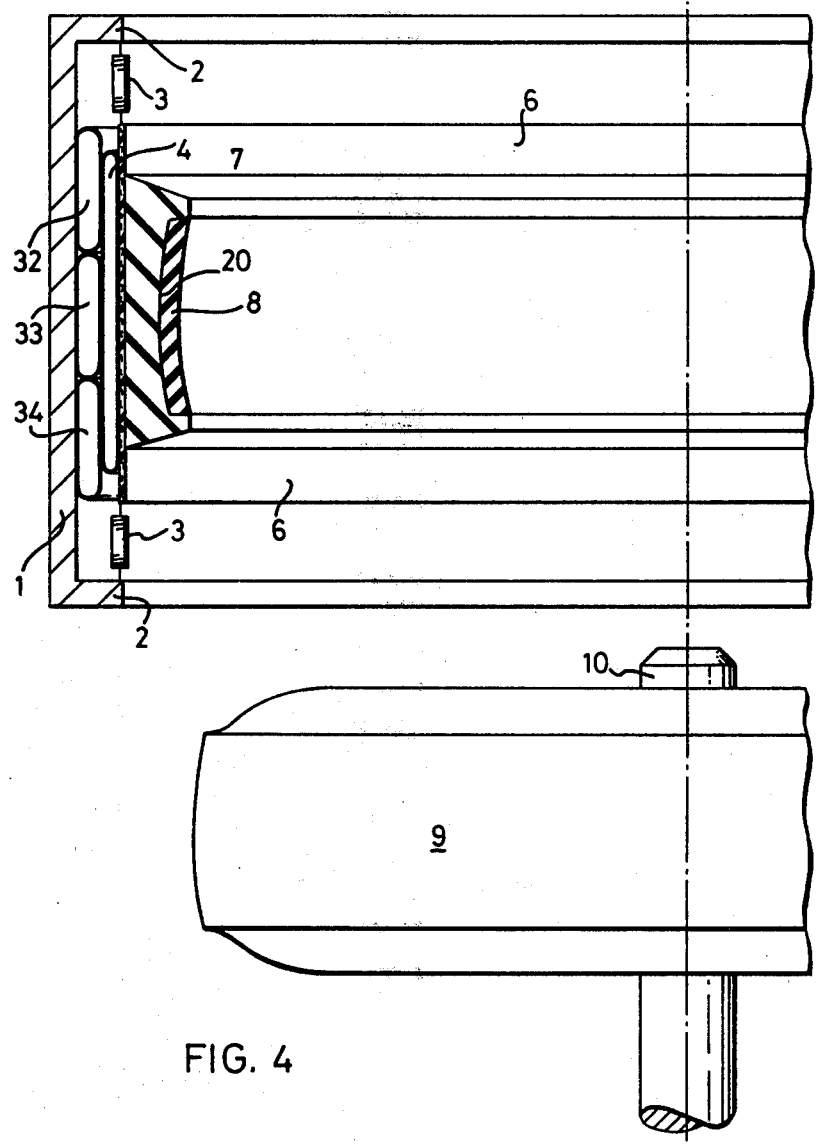
FIG. 4 is a transverse sectional view through a tyre treading apparatus similar to that of FIG. 1, but showing an alternative arrangement of air bags.

Referring now to FIG. 3 of the drawings, the air bags 4 and 5 are shown deflated after the tyre treading process is completed. The tread band 8 has a compressive stress therein, due to its circumference having been shortened. The assembly of tread band and carcass 9 can be removed from the entire treading apparatus by moving the ram 10 away from the apparatus, thereby leaving the apparatus free to receive another tread band 8 and carcass 9.

If it is desired to vulcanise the bonding surface between the tread band 8 and carcass 9 away from the tyre treading apparatus, the tyre assembly of tread band 8 and carcass 9 may be conveniently placed in a suitable vulcanising mould commonly used in the art.

Referring now to FIG. 5 of the drawings, wherein like parts have the same reference numerals as in FIG. 1, adjacent inextensible air bags 32, 33 and 34, of the type described in British patent specification No. 963,953, are located in the space formed between the flexible ring 6 and the inner surface of the support 1. Between these air bags and the ring 6, is located the larger air bag 4. The arrangement is such that there is a sandwich of two air bag layers between ring 6 and inner surface of support 1, one layer consisting of bags 32, 33 and 34, and the second layer consisting of the single bag 4.

Referring now to FIG. 6 of the drawings, air bag 33 is inflated by supplying air under pressure to it, and this forces the central regions of air bag 4 and tread band holder 7 towards the tyre carcass 9. Consequently, the tread band 8 is urged towards the carcass 9 and initial contact between the tread band and tyre carcass is made along the mid-circumferential line 35. During the movement of the tread holder 7, there is a substantial variation in its shape and the holder 7 may be provided with axial passages 13 and marginal cavities 14 which accommodate the flexing of the holder 7, and help to reduce resistance to movement (see FIG. 5).

Figure 7:
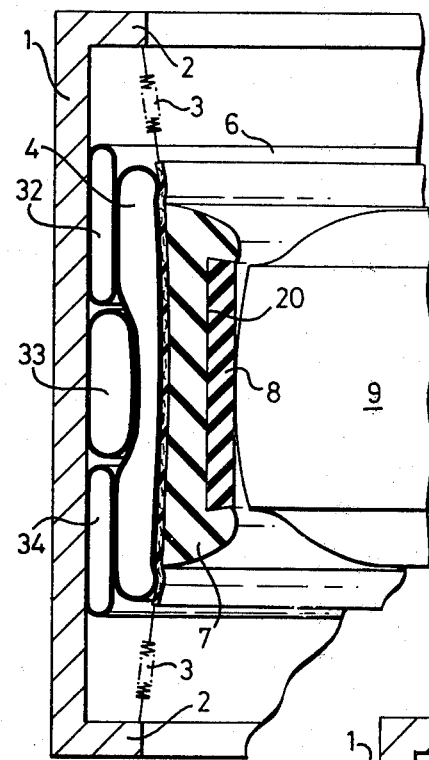
FIGS. 7 and 8 are similar views to FIG. 6, showing two further stages in contacting the tread band with the tyre carcass.

Referring to FIG. 7, when the initial contact between tread band 8 and tyre carcass 9 has been made, air pressure is supplied to air bag 4, causing the tread band 8 to move further towards the tyre carcass 9 and to widen progressively the area of contact between the tread band 8 and the tyre carcass 9. At the same time, air between the tread band and tyre carcass is expelled.

Figure 8:
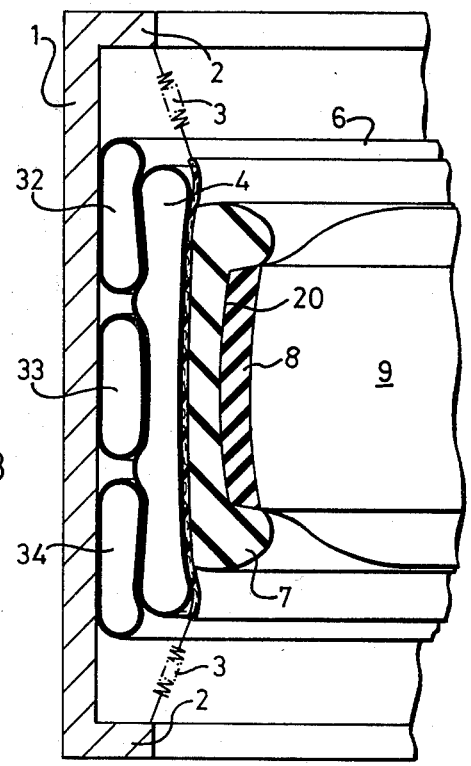

In order to complete the contact between the tread band and tyre carcass, air pressure is supplied to air bags 32 and 34 so as to force the outer portions of the tread holder 7 towards the carcass 9, (see FIG. 8). Thus, it will be appreciated that complete contact between the tread band 8 and tyre carcass 9 can be obtained without air being trapped between them.

After vulcanisation has taken place, the tread band will have retained therein a compressive stress which lasts throughout the life of the tread and provides longer service and greater resistance to abrasion than conventionally treaded tyres.

What is claimed is:

1. A method of applying a tread band to a tyre carcass comprising the steps of
    (a) providing a pre-vulcanised tread band and a continuous annular resilient tread band holder
    (b) locating said tread band, whose inner periphery is greater than the outer periphery of a tyre carcass to be treaded, on the inner surface of said tread band holder, said tread band holder being of an adjustable diameter due to its resilient construction,
    (c) positioning a tyre carcass adjacent said tread band so that their mid-circumferential planes coincide,
    (d) urging the tread band into contact with the tyre carcass by reducing the diameter of the tread band holder, thereby shortening the outer periphery of the tread band and causing a generally uniform circumferential compressive stress to be set up in the tread band, the compressive stress being maintained while the band is bonded to the carcass so that, in the final assembly of tyre carcass and tread band, the outer periphery of the tread band is under compressive stress.

2. A method according to claim 1 wherein the tread band is urged into contact with the tyre carcass so that the mid-circumferential lines of the peripheries of the tread band and tyre carcass first make contact, with subsequent lateral outspreading contact between said peripheries.

3. A method according to claim 1 wherein the diameter of the tread band holder is reduced by deforming the band holder inwardly.

4. A method according to claim 3 wherein the tread band holder is deformed inwardly by means of fluid pressure applied to an inflatable bag located adjacent the outer periphery of the tread band holder.

5. A method according to claim 4 wherein the tread band holder is subjected to a resilient, laterally outward bias while being deformed inwardly.

6. A method according to claim 3 wherein the outer periphery of the tread band is shortened by at least 0.5%.

7. A method according to claim 6 wherein the outer periphery is shortened by from 1% to 10%.

8. Apparatus for applying a tread band to a tyre carcass comprising
    a continuous annular resilient tread band holder having an inner surface against which is adapted to be located a pre-vulcanised tread band whose inner periphery is greater than the outer periphery of a tyre carcass to be treaded,
    said tread band holder being of an adjustable diameter due to its resilient construction,
    means for locating a tyre carcass adjacent the tread band so that their mid-circumferential planes coincide,
    and means for urging the tread band into contact with the tyre carcass by reducing the diameter of the tread band holder, thereby shortening the outer periphery of the tread band and causing a generally uniform circumferential compressive stress to be set up in the tread band, the compressive stress being maintained while the band is bonded to the carcass so that, in the final assembly of tyre carcass and tread band, the outer periphery of the tread band is under compressive stress.

9. Apparatus according to claim 19 wherein marginal cavities are formed in the thread band holder for accommodating the flexing of the holder during its deformation.

10. Apparatus according to claim 8 including chamber means in said tread band holder for accommodating the reduction in the diameter of the tread band holder.

11. Apparatus according to claim 10 wherein said chamber means are radial passages in the tread band holder.

12. Apparatus according to claim 10 wherein said chamber means are marginal cavities in the tread band holder.

13. Apparatus according to claim 8 wherein a rigid coaxial annular support, of greater diameter than the tread band holder, is provided, to which is resiliently attached the tread band holder.

14. Apparatus according to claim 13 wherein the tread band holder is attached to the annular support by means of a series of springs attached to side flanges on the annular support, the springs being circumferentially spaced around the flanges.

15. Apparatus according to claim 14 wherein a ring of flexible material carries the tread band holder, said ring having a width greater than that of the band holder and being attached to the annular support.

16. Apparatus according to claim 8 wherein the tread band holder includes a central resilient portion which is thinner than the side portions thereof, a longitudinal channel being formed in the central portion to accommodate the tread band.

17. Apparatus according to claim 13 wherein said urging means includes a first inflatable bag sandwiched between the annular support and an outer periphery of the tread band holder.

18. Apparatus according to claim 17 wherein said urging means further includes a second inflatable bag, of larger transverse cross-section than the first inflatable bag, is sandwiched between the first bag and the tread band holder.

19. Apparatus according to claim 18 wherein said urging means further includes two further air bags sandwiched between the marginal regions of the second bag and the annular support, one on each side of the first inflatable bag.

20. Apparatus according to claim 19 wherein radial passages are formed in the tread band holder for accommodating the flexing of the holder during its deformation.

* * * * *